(12) United States Patent
Ogasawara et al.

(10) Patent No.: US 6,521,377 B2
(45) Date of Patent: Feb. 18, 2003

(54) POSITIVE ELECTRODE ACTIVE MATERIAL FOR ALKALINE STORAGE BATTERIES, POSITIVE ELECTRODE FOR ALKALINE STORAGE BATTERIES, AND ALKALINE STORAGE BATTERY

(75) Inventors: Takeshi Ogasawara, Hirakata (JP); Mitsunori Tokuda, Osaka (JP); Nobuyuki Higashiyama, Ikeda (JP); Yasuhiko Itoh, Yawata (JP)

(73) Assignee: Sanyo Electric Co., Ltd., Osaka (JP)

( * ) Notice: Subject to any disclaimer, the term of this patent is extended or adjusted under 35 U.S.C. 154(b) by 210 days.

(21) Appl. No.: 09/745,668

(22) Filed: Dec. 26, 2000

(65) Prior Publication Data

US 2001/0008729 A1 Jul. 19, 2001

(30) Foreign Application Priority Data

Dec. 27, 1999 (JP) ............................. 11-368530

(51) Int. Cl.$^7$ ............................. H01M 4/32; H01M 4/52
(52) U.S. Cl. .................. 429/223; 429/231.3; 429/218.1
(58) Field of Search ............................. 429/223, 231.3, 429/218.1

(56) References Cited

U.S. PATENT DOCUMENTS 6,007,946 A   12/1999  Yano et al. ................. 429/223
6,218,046 B1 *  4/2001  Tanigawa et al. ........... 429/223
6,287,726 B1 *  9/2001  Ohta et al. .................. 429/223

FOREIGN PATENT DOCUMENTS

JP   03078965 A   4/1991
JP   10021901 A   1/1998
JP   10021909 A   1/1998

OTHER PUBLICATIONS

Cotton and Wilkinson, Advanced Inorganic Chemistry, Interscience Publishers, Third Ed., pp. 874–886.*

* cited by examiner

Primary Examiner—Carol Chaney
Assistant Examiner—Angela J. Martin
(74) Attorney, Agent, or Firm—Armstrong, Westerman & Hattori LLP

(57) ABSTRACT

In a positive electrode active material for alkaline storage batteries according to the present invention, a surface of a nickel hydroxide is coated with a mixed crystal material of at least one type of element selected from aluminum Al, manganese Mn, iron Fe, yttrium Y, ytterbium Yb, erbium Er, and gadolinium Gd and cobalt, the valence of nickel in the nickel hydroxide is in the range of 2.0 to 2.3, and the valence of cobalt in the mixed crystal material exceeds 3.0. The positive electrode active material for alkaline storage batteries is used for a positive electrode for alkaline storage batteries, and the positive electrode for alkaline storage batteries is further used for an alkaline storage battery.

14 Claims, 1 Drawing Sheet

POSITIVE ELECTRODE ACTIVE MATERIAL FOR ALKALINE STORAGE BATTERIES, POSITIVE ELECTRODE FOR ALKALINE STORAGE BATTERIES, AND ALKALINE STORAGE BATTERY

BACKGROUND OF THE INVENTION

1. Field of the Invention

The present invention relates to a positive electrode active material for alkaline storage batteries used for a positive electrode of an alkaline storage battery such as a nickel-hydrogen storage battery or a nickel-cadmium storage battery, a positive electrode for alkaline storage batteries using such a positive electrode active material for alkaline storage batteries, and an alkaline storage battery, and is particularly characterized in that the positive electrode active material for alkaline storage batteries is improved, to obtain a high discharge capacity in the alkaline storage battery.

2. Description of the Related Art

Conventionally, in an alkaline storage battery such as a nickel-hydrogen storage battery or a nickel-cadmium storage battery, a sintered nickel electrode and a non-sintered nickel electrode have been used as its positive electrode.

In the sintered nickel electrode, a porous sintered nickel substrate obtained by sintering has been used, and the porous sintered nickel substrate has been chemically impregnated with a salt of an active material and has been filled with the active material.

In an alkaline storage battery using such a sintered nickel electrode, it has been necessary to use a sintered nickel substrate having a high degree of porosity to fill the sintered nickel substrate with a lot of active materials in order to obtain a sufficient battery capacity.

When the sintered substrate having a high degree of porosity is used, however, a bond between nickel particles by the sintering is weak. Accordingly, the nickel particles drop out of the sintered substrate. Further, the pore diameter in the sintered nickel substrate is generally small, for example, not more than 10 $\mu$m. In order to sufficiently fill the sintered nickel substrate with the active material, therefore, laborious work for impregnating the sintered nickel substrate with the active material must be repeatedly performed again and again, thereby degrading productivity.

In recent years, a non-sintered nickel electrode using a paste obtained by adding a binder such as methyl cellulose to an active material mainly composed of a nickel hydroxide and so adapted as to fill a conductive base material having a high degree of porosity such as foamed nickel with the paste has been used.

In the case of the non-sintered nickel electrode, it is possible to use a conductive base material having a high degree of porosity such as foamed nickel, as described above, to fill the conductive base material with a lot of active materials as well as to make it easy to perform work for filling the conductive base material with the active materials.

When the base material having a high degree of porosity is used, as described above, in the non-sintered nickel electrode, however, collecting current in the base material becomes difficult, thereby reducing the utilization of the active materials. When the non-sintered nickel electrode is used for a positive electrode of the alkaline storage battery, a sufficient battery capacity cannot be obtained.

In recent years, in order to increase the utilization of an active material in a non-sintered nickel electrode, it has been proposed that used as a positive electrode active material for alkaline storage batteries is one obtained by coating a surface of a nickel hydroxide with a cobalt compound indicated by a structural formula $Co_{1-x}A_x(OH)_2B_y$ or $Co_{1-x}A_xOOH$ [in the structural formula, A is an element belonging to any one of the groups 1B, 2A, 2B, 3A, 4A, 5A, 6A, 7A, and 8A of the periodic system, boron, or aluminum, B is any one of a sulfate ion, a nitrate ion, a carbonate ion, a borate ion, and a phosphate ion, x is 0.05 to 0.5, and y is {(the valence of the element A)–2}×x/(the valence of the ion B).], as disclosed in JP-A-10-21901.

Even when the positive electrode active material described in the above-mentioned gazette is used for the positive electrode of the alkaline storage battery, however, conductivity of the positive electrode active material are not sufficient, thereby making it difficult to sufficiently increase the utilization of the positive electrode active material. Accordingly, a high discharge capacity cannot be still obtained.

SUMMARY OF THE INVENTION

An object of the present invention is to improve a positive electrode active material used for a positive electrode of an alkaline storage battery to sufficiently improve conductivity of the positive electrode of the alkaline storage battery and increase the utilization of the positive electrode active material, thereby obtaining a high discharge capacity in the alkaline storage battery.

The present invention is directed to a positive electrode active material for alkaline storage batteries, wherein a surface of a nickel hydroxide is coated with a mixed crystal material of at least one type of element selected from aluminum Al, manganese Mn, iron Fe, yttrium Y, ytterbium Yb, erbium Er, and gadolinium Gd and cobalt, the valence of nickel in the nickel hydroxide being in the range of 2.0 to 2.3, and the valence of cobalt in the mixed crystal material exceeding 3.0.

As in the positive electrode active material for alkaline storage batteries according to the present invention, when the surface of the nickel hydroxide is coated with the above-mentioned mixed crystal material, conductivity of the positive electrode active material are improved, so that the utilization of the positive electrode active material is increased, thereby making it possible to obtain a high discharge capacity.

The reason why in the positive electrode active material for alkaline storage batteries in the present invention, the valence of nickel in the nickel hydroxide is in the range of 2.0 to 2.3, as described above, is that when the valence of Ni exceeds 2.3, a capacity in first charging the alkaline storage battery using the positive electrode active material is reduced and is determined by the capacity of a negative electrode, thereby making it impossible to obtain a high discharge capacity.

The reason why in the positive electrode active material for alkaline storage batteries in the present invention, the valence of cobalt in the mixed crystal material exceeds 3.0, as described above, is that when the valence of cobalt is not more than 3.0, conductivity of the positive electrode active material cannot be sufficiently improved, so that the utilization of the positive electrode active material is reduced, thereby making it impossible to obtain a high discharge capacity.

In setting the valence of nickel in the nickel hydroxide in the range of 2.0 to 2.3 and setting the valence of cobalt in the mixed crystal material to more than 3.0, as described above, the surface of the nickel hydroxide is coated with the mixed crystal material of the above-mentioned element and cobalt, and is then oxidized by an oxidizing agent such as sodium hypochlorite under the presence of an alkaline solution or is oxidized with air under the presence of the alkaline solution. Examples of the oxidizing agent include known oxidizing agents such as peroxodisulfate, persulfate, and hydrogen peroxide in addition to the sodium hypochlorite.

In the mixed crystal material of at least one type of element selected from aluminum Al, manganese Mn, iron Fe, yttrium Y, ytterbium Yb, erbium Er, and gadolinium Gd with which the surface of the nickel hydroxide is coated and cobalt, when the content of Al, Mn, Fe, Y, Yb, Er, and Gd in the mixed crystal material is less than 5 wt % (% by weight) of the total amount of the elements and cobalt, it is difficult for the valence of cobalt in the mixed crystal material to exceed 3.0, thereby making it impossible to sufficiently improve the conductivity of the positive electrode active material. On the other hand, when the content of Al, Mn, Fe, Y, Yb, Er, and Gd in the mixed crystal material is increased to exceed 50 wt %, the conductivity of the mixed crystal material is reduced, thereby making it impossible to sufficiently improve the conductivity of the positive electrode active material. Therefore, it is preferable that the total amount of the elements, i.e., aluminum Al, manganese Mn, iron Fe, yttrium Y, ytterbium Yb, erbium Er, and gadolinium Gd contained in the mixed crystal material is in the range of 5 to 50 wt % of the total amount of the elements and cobalt.

In coating the surface of the nickel hydroxide with the mixed crystal material of at least one type of element selected from aluminum Al, manganese Mn, iron Fe, yttrium Y, ytterbium Yb, erbium Er, and gadolinium Gd and cobalt, as described above, when the amount of the mixed crystal material is small, the conductivity of the positive electrode active material cannot be sufficiently improved. On the other hand, if the amount of the mixed crystal material is too large, the ratio of the nickel hydroxide to be charged or discharged is reduced, thereby making it impossible to obtain a sufficient battery capacity. Therefore, it is preferable that the amount of cobalt in the mixed crystal material with which the surface of the nickel hydroxide is coated is in the range of 1 to 10 wt % of the amount of the nickel hydroxide.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
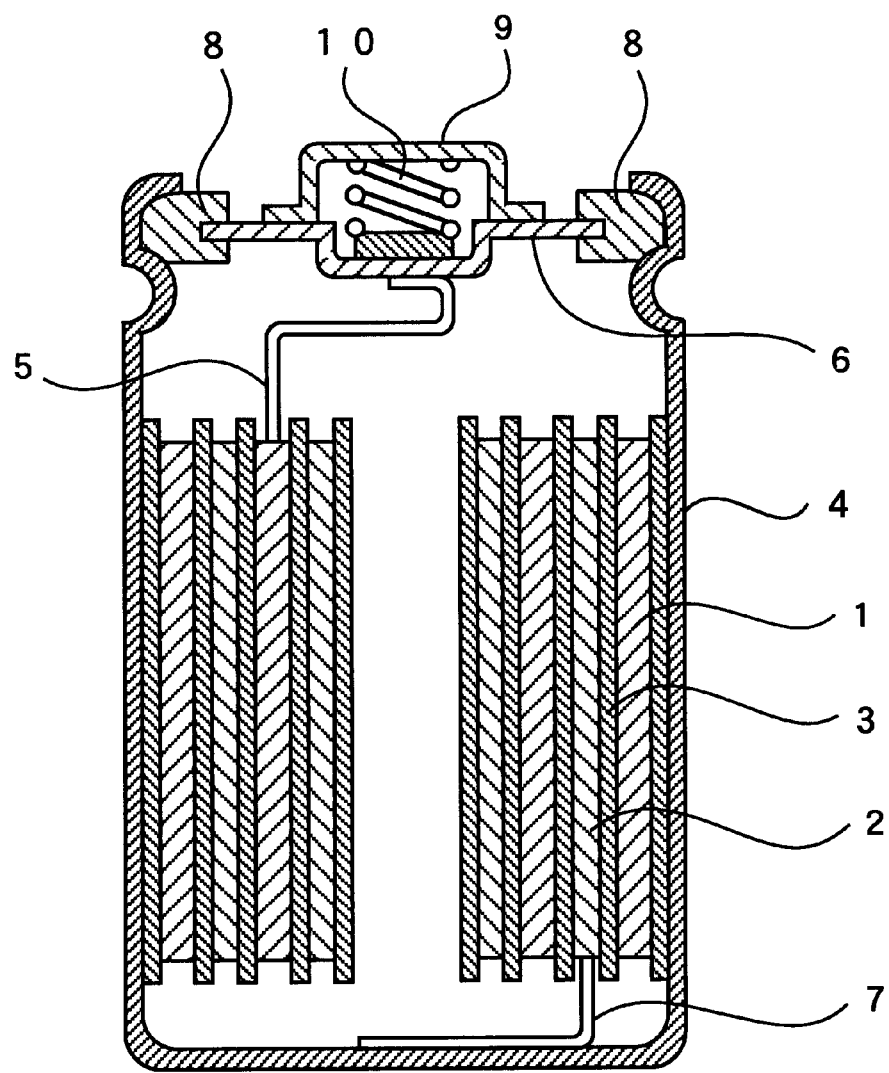
FIG. 1 is a schematic sectional view showing the internal structure of an alkaline storage battery fabricated in each of examples and comparative examples of the present invention.

A positive electrode active material for alkaline storage batteries, a positive electrode for alkaline storage batteries, and an alkaline storage battery according to the present invention will be specifically described on the basis of examples, and comparative examples are taken, to clarify that in the case of alkaline storage batteries in the examples of the present invention, a high discharge capacity is obtained. The present invention is not limited to those described in the following examples, and can be embodied by being suitably changed in the range in which the gist thereof is not changed.

As a mixed crystal material of at least one type of element selected from aluminum Al, manganese Mn, iron Fe, yttrium Y, ytterbium Yb, erbium Er, and gadolinium Gd and cobalt with which the surface of a nickel hydroxide is coated, various types of mixed crystal materials, as described below, are produced, to examine the valence of cobalt Co in each of the mixed crystal materials.

(Mixed Crystal Material A1)

In obtaining a mixed crystal material A1, 11.4 g of cobalt sulfate and 6.9 g of aluminum sulfate were dissolved in water such that the weight ratio of cobalt to aluminum would be 80:20, to obtain 1 liter of a solution, as shown in the following Table 1. A 10 wt % sodium hydroxide aqueous solution was added to the obtained solution, to adjust the pH of the solution to 11. A precipitate thus obtained was filtered, was rinsed, and was dried, to obtain a mixed crystal material of cobalt and aluminum.

The mixed crystal material and a 50 wt % sodium hydroxide aqueous solution were mixed at a weight ratio of 1:10, and 22.9 g of a 12 wt % sodium hypochlorite aqueous solution which is an oxidizing agent was added to and mixed with an obtained mixture, as shown in the following Table 1. The resulting mixture was heated to 50° C., was agitated for 0.5 hours, and was then rinsed, to remove an excess sodium hypochlorite aqueous solution. Thereafter, an obtained precipitate was filtered and was dried, to obtain the mixed crystal material A1.

The amount of aluminum was 20 wt % of the total amount of cobalt and aluminum in the mixed crystal material A1, as shown in the following Table 2, when it was found by the emission spectrochemical analysis (ICP).

(Mixed Crystal Materials A2 to A7)

In obtaining mixed crystal materials A2 to A7, aluminum sulfate used in the mixed crystal material A1 was replaced with manganese sulfate in the mixed crystal material A2, iron sulfate in the mixed crystal material A3, yttrium sulfate in the mixed crystal material A4, ytterbium sulfate in the mixed crystal material A5, erbium sulfate in the mixed crystal material A6, and gadolinium sulfate in the mixed crystal material A7. Solutions obtained by respectively dissolving cobalt sulfate and the above-mentioned manganese sulfate, iron sulfate, yttrium sulfate, ytterbium sulfate, erbium sulfate, and gadolinium sulfate in water at ratios shown in the following Table 1 such that the weight ratio of each of the elements, i.e., manganese, iron, yttrium, ytterbium, erbium, and gadolinium to cobalt would be 20:80 were used, to obtain mixed crystal materials of the elements and cobalt.

A mixed crystal material A2 of manganese and cobalt, a mixed crystal material A3 of iron and cobalt, a mixed crystal material A4 of yttrium and cobalt, a mixed crystal material A5 of ytterbium and cobalt, a mixed crystal material A6 of erbium and cobalt, and a mixed crystal material A7 of gadolinium and cobalt were obtained, as shown in the following Table 2, similarly to the above-mentioned mixed crystal material A1 except that a 12 wt % sodium hypochlorite aqueous solution which is an oxidizing agent was added to each of the mixed crystal materials at a ratio shown in the following Table 1.

The amount of each of the elements was 20 wt % of the total amount of cobalt and the element in each of the mixed crystal materials A2 to A7, as shown in the following Table 2, when it was found by the emission spectrochemical analysis (ICP).

(Mixed Crystal Materials A8 to A11)

In obtaining mixed crystal materials A8 to A11, a solution obtained by dissolving cobalt sulfate and aluminum sulfate in water at a ratio shown in the following Table 1 such that the weight ratio of cobalt to aluminum would be 99:1 in the mixed crystal A8, 95:5 in the mixed crystal A9, 50:50 in the mixed crystal A10, and 40:60 in the mixed crystal A11 was used, to obtain a mixed crystal material of cobalt and aluminum.

Mixed crystal materials A8 to A11 of cobalt and aluminum were obtained similarly to the above-mentioned mixed crystal material A1 except that a 12 wt % sodium hypochlorite aqueous solution which is an oxidizing agent was added to each of the obtained mixed crystal materials of cobalt and aluminum at a ratio shown in the following Table 1.

The amount of aluminum was 1 wt % in the mixed crystal material A8, 5 wt % in the mixed crystal material A9, 50 wt % in the mixed crystal material A10, and 60 wt % in the mixed crystal material A11 of the total amount of cobalt and aluminum in the mixed crystal material when it was found by the emission spectrochemical analysis (ICP).

(Mixed Crystal Material A12)

In obtaining a mixed crystal material A12, yttrium sulfate was added in addition to cobalt sulfate and aluminum sulfate in the above-mentioned mixed crystal material A1, and a solution obtained by dissolving cobalt sulfate, aluminum sulfate, and yttrium sulfate in water at a ratio shown in the following Table 1 such that the weight ratio of cobalt, aluminum, and yttrium would be 80:10:10 was used, to obtain a mixed crystal material of cobalt, aluminum, and yttrium.

The mixed crystal material A12 of cobalt, aluminum, and yttrium was obtained similarly to the above-mentioned mixed crystal material A1 except that a 12 wt % sodium hypochlorite aqueous solution which is an oxidizing agent was added to the obtained mixed crystal material of cobalt, aluminum, and yttrium at the ratio shown in the following Table 1.

The amounts of aluminum and yttrium were respectively 10 wt % of the total amount of cobalt, aluminum, and yttrium in the mixed crystal material A12, as shown in the following Table 2, when they were found by the emission spectrochemical analysis (ICP).

(Mixed Crystal Material A13)

A mixed crystal material A13 of cobalt and aluminum was obtained similarly to the above-mentioned mixed crystal material A1 except that a sodium hydroxide aqueous solution was not added in adding a sodium hypochlorite aqueous solution which is an oxidizing agent to a mixed crystal material of cobalt and aluminum in the mixed crystal material A1 and reacting them.

The amount of aluminum was 20 wt %, as in the mixed crystal material A1, of the total amount of cobalt and aluminum in the mixed crystal material A13, as shown in the following Table 2, when it was found by the emission spectrochemical analysis (ICP).

(Cobalt Compound)

A cobalt compound was obtained similarly to the above-mentioned mixed crystal material A1 except that aluminum sulfate used in the mixed crystal material A1 was not used, and only cobalt sulfate was used.

The valence of cobalt Co was measured by $Fe^{2+}/Fe^{3+}$ redox titration with respect to each of the mixed crystal materials A1 to A13 and the cobalt compound obtained in the above-mentioned manner. The results were also shown in the following Table 2.

TABLE 1

| | use of cobalt sulfate (g) | additive type | additive amount of use (g) | use of sodium hypochlorite (g) |
|---|---|---|---|---|
| mixed crystal material A1 | 11.4 | aluminum sulfate | 6.9 | 22.9 |
| mixed crystal material A2 | 13.3 | manganese sulfate | 5.5 | 26.6 |
| mixed crystal material A3 | 13.3 | iron sulfate | 9.0 | 26.6 |
| mixed crystal material A4 | 13.3 | yttrium sulfate | 4.3 | 26.7 |
| mixed crystal material A5 | 13.8 | ytterbium sulfate | 3.0 | 26.7 |
| mixed crystal material A6 | 13.8 | erbium sulfate | 2.4 | 26.7 |
| mixed crystal material A7 | 13.8 | gadolinium sulfate | 3.1 | 27.6 |
| mixed crystal material A8 | 16.4 | aluminum sulfate | 0.4 | 32.8 |
| mixed crystal material A9 | 15.2 | aluminum sulfate | 1.9 | 30.4 |
| mixed crystal material A10 | 5.9 | aluminum sulfate | 14.2 | 8.9 |
| mixed crystal material A11 | 4.4 | aluminum sulfate | 16.1 | 11.8 |
| mixed crystal material A12 | 12.3 | aluminum sulfate | 3.7 | 24.7 |
| | | yttrium sulfate | 2.0 | |
| mixed crystal material A13 | 11.4 | aluminum sulfate | 6.9 | 22.9 |
| cobalt compound | 16.7 | — | — | 33.4 |

TABLE 2

| | mixed crystal element with Co | | valance of Co |
|---|---|---|---|
| | type | ratio (wt %) | |
| mixed crystal material A1 | Al | 20 | 3.53 |
| mixed crystal material A2 | Mn | 20 | 3.54 |
| mixed crystal material A3 | Fe | 20 | 3.53 |
| mixed crystal material A4 | Y | 20 | 3.52 |
| mixed crystal material A5 | Yb | 20 | 3.53 |
| mixed crystal material A6 | Er | 20 | 3.54 |
| mixed crystal material A7 | Gd | 20 | 3.52 |
| mixed crystal material A8 | Al | 1 | 3.02 |
| mixed crystal material A9 | Al | 5 | 3.15 |
| mixed crystal material A10 | Al | 50 | 3.53 |
| mixed crystal material A11 | Al | 60 | 3.54 |
| mixed crystal material A12 | Al + Y | 10 + 10 | 3.54 |
| mixed crystal material A13 | Al | 20 | 3.00 |
| cobalt compound | — | — | 3.00 |

As a result, in the mixed crystal materials A1 to A12 obtained by oxidizing a mixed crystal material of at least one type of element selected from aluminum Al, manganese Mn, iron Fe, yttrium Y, ytterbium Yb, erbium Er, and gadolinium Gd and cobalt with the oxidizing agent in the alkaline solution, the valence of cobalt in the mixed crystal material exceeded 3.0. On the other hand, in the mixed crystal material A13 using no alkaline solution in oxidizing the mixed crystal material with the oxidizing agent, the valence of cobalt in the mixed crystal material was 3.0. Also in the cobalt compound which was not crystallized, together with the above-mentioned element, the valence of cobalt was 3.0.

EXAMPLE 1

In the example 1, in obtaining a positive electrode active material, a 5 wt % ammonium aqueous solution and a 5 wt % sodium hydroxide aqueous solution were simultaneously dropped in a solution having nickel sulfate dissolved therein, to keep the pH of the solution at 11, thereby depositing nickel hydroxide. An obtained precipitate was filtered, was rinsed, and was dried under vacuum, to obtain particles of the nickel hydroxide.

100 g of the nickel hydroxide was added to a solution obtained by dissolving 13.1 g of cobalt sulfate containing cobalt whose amount was 5 wt % of the amount of the nickel hydroxide and 7.9 g of aluminum sulfate containing aluminum in such an amount that the weight ratio of cobalt to aluminum would be 80:20, and a 5 wt % sodium hydroxide aqueous solution was added to an obtained mixture while agitating the mixture, to adjust the pH of the solution to 11. Thereafter, the resulting mixture was agitated for one hour. When the pH was slightly lowered during the reaction, a 5 wt % sodium hydroxide aqueous solution was suitably dropped in the mixture, to keep the pH at 11.

An obtained precipitate was filtered after the reaction was terminated, was rinsed, and was dried under vacuum, to obtain particles of nickel hydroxide having a coating layer composed of a mixed crystal material of cobalt and aluminum formed on its surface.

The particles of the nickel hydroxide having the coating layer composed of the mixed crystal material of cobalt and aluminum thus formed thereon and a 50 wt % sodium hydroxide aqueous solution were mixed at a weight ratio of 1:1, and 26.4 g of a 12 wt % sodium hypochlorite aqueous solution which is an oxidizing agent was added to and mixed with an obtained mixture. The resulting mixture was heated to 50° C., and was agitated for 0.5 hours.

After an excess sodium hypochlorite aqueous solution was removed by rinsing after the reaction was terminated, the precipitate was filtered and was dried at 65° C., to obtain a positive electrode active material having a coating layer composed of a mixed crystal material of cobalt and aluminum on a surface of the nickel hydroxide. In the positive electrode active material thus obtained, the amount of cobalt Co in the coating layer formed on the surface of the nickel hydroxide was 5 wt % of the amount of the nickel hydroxide, the amount of aluminum Al was 20 wt % of the total amount of cobalt and aluminum in the coating layer, the valence of cobalt Co in the coating layer was 3.53, and the valence of nickel Ni in the nickel hydroxide was 2.0, as shown in the following Table 3.

100 g of the positive electrode active material powder and 20 g of a 1 wt % solution of methyl cellulose were kneaded to prepare a paste. A porous base material composed of a nickel-plated foamed metal having a degree of porosity of 95% and having an average pore diameter of 200 μm was filled with the paste. The base material filled with the paste was dried and was then formed by pressure, to obtain nickel for alkaline storage batteries.

A nickel electrode for alkaline storage batteries obtained in the above-mentioned manner was then used as a positive electrode, to fabricate an alkaline storage battery of AA size having a cylindrical shape and having a battery capacity of approximately 1000 mAh, as shown in FIG. 1.

In the alkaline storage battery, used as its negative electrode was a cadmium electrode having an electrochemical capacity which is approximately 1.8 times that of the positive electrode by applying a paste obtained by kneading cadmium oxide powder, metal cadmium powder, and a binder to a nickel plated metal which is a core material and drying the nickel plated metal coated with the paste, used as a separator was a polyamide non woven fabric, and used as an alkali electrolyte was a 30 wt % potassium hydroxide aqueous solution.

In producing the alkaline storage battery, a separator 3 was interposed between a positive electrode 1 and a negative electrode 2, was wound up in a spiral shape, and was contained in a negative electrode can 4, as shown in FIG. 1. Thereafter, the electrolyte was poured into the negative electrode can 4, to seal the negative electrode can 4. The positive electrode 1 was connected to a sealing cover 6 through a positive electrode lead 5, and the negative electrode 2 was connected to the negative electrode can 4 through a negative electrode lead 7. The negative electrode can 4 and the sealing cover 6 were electrically insulated by an insulating packing 8, and a coil spring 10 was provided between the sealing cover 6 and a positive electrode external terminal 9. When the internal pressure of the battery was abnormally raised, the coil spring 10 was compressed, so that gas inside the battery was released into the air.

EXAMPLES 2 to 5

In the examples 2 to 5, in obtaining a positive electrode active material, nickel hydroxide was added to a solution having cobalt sulfate and aluminum sulfate dissolved therein in the above-mentioned example 1, to obtain particles of the nickel hydroxide having a coating layer composed of a mixed crystal material of cobalt and aluminum formed on its surface, the amount of the cobalt sulfate was set to 13.1 g such that the amount of cobalt was 5 wt % of 100 g of the nickel hydroxide, while the amount of the aluminum sulfate was changed.

Each of the positive electrode active materials was produced in the same manner as that in the above-mentioned example 1 except that the amount of aluminum sulfate was set to 0.3 g such that the weight ratio of cobalt to aluminum would be 99:1 in the example 2, the amount of aluminum sulfate was set to 1.7 g such that the weight ratio of cobalt to aluminum would be 95:5 in the example 3, the amount of aluminum sulfate was set to 31.6 g such that the weight ratio of cobalt to aluminum would be 50:50 in the example 4, and the amount of aluminum sulfate was set to 47.5 g such that the weight ratio of cobalt to aluminum would be 40:60.

In each of the positive electrode active materials, the amount of cobalt Co in the coating layer formed on the surface of the nickel hydroxide was 5 wt % of the amount of the nickel hydroxide, as in the positive electrode active material in the example 1.

Furthermore, the amount of aluminum Al in the total mount of cobalt and aluminum in the coating layer of each of the positive electrode active materials, the valence of cobalt Co in the coating layer, and the valence of nickel Ni in the nickel hydroxide were found. As shown in the following Table 3, the amount of Al was 1 wt %, the valence of Co was 3.02, and the valence of Ni was 2.0 in the positive electrode active material in the example 2, the amount of Al was 5 wt %, the valence of Co was 3.15, and the valence of Ni was 2.0 in the positive electrode active material in the example 3, the amount of Al was 50 wt %, the valence of Co was 3.54, and the valence of Ni was 2.0 in the positive electrode active material in the example 4, and the amount of Al was 60 wt %, the valence of Co was 3.54, and the valence of Ni was 2.0 in the positive electrode active material in the example 5.

Each of the alkaline storage batteries in the examples 2 to 5 was fabricated in the same manner as that in the example 1 except that each of the positive electrode active materials produced in the above-mentioned manner was used.

Comparative Example 1

In the comparative example 1, a positive electrode active material was produced in the same manner as that in the above-mentioned example 1 except that a sodium hydroxide aqueous solution was not added in adding a sodium hypochlorite aqueous solution which is an oxidizing agent to particles of nickel hydroxide having a coating layer composed of a mixed crystal material of cobalt and aluminum formed thereon and reacting them.

In the positive electrode active material thus obtained, the amount of cobalt Co in the coating layer formed on the surface of the nickel hydroxide was 5 wt % of the amount of the nickel hydroxide, the amount of aluminum Al was 20 wt % of the total amount of cobalt and aluminum in the coating layer, the valence of cobalt Co in the coating layer was 3.00, and the valence of nickel Ni in the nickel hydroxide was 2.0.

The alkaline storage battery in the comparative example 1 was fabricated in the same manner as that in the above-mentioned example 1 except that the positive electrode active material produced in the above-mentioned manner was used.

Comparative Example 2

In the comparative example 2, a positive electrode active material was produced in the same manner as that in the above-mentioned example 1 except that in providing a coating layer on surfaces of particles of nickel hydroxide, aluminum sulfate was not used, and only cobalt sulfate was used, to form a coating layer composed of cobalt hydroxide on the surfaces of the particles of the nickel hydroxide.

In the positive electrode active material thus obtained, the amount of cobalt Co in the coating layer formed on the surface of the nickel hydroxide was 5 wt % of the amount of the nickel hydroxide, while no aluminum existed in the coating layer, as shown in the following Table 3. Further, the valence of cobalt Co in the coating layer was 3.00, and the valence of nickel Ni in the nickel hydroxide was 2.0.

The alkaline storage battery in the comparative example 2 was fabricated in the same manner as that in the example 1 except that the positive electrode active material produced in the above-mentioned manner was used.

Each of the alkaline storage batteries in the examples 1 to 5 and the comparative examples 1 and 2 was charged at a current of 100 mA (corresponding to 0.1 C) for 16 hours, and was discharged to 1.0 V at a current of 1 A (corresponding to 1 C). Charging/discharging was taken as one cycle. Charging/discharging in three cycles was performed, to find a discharge capacity in the third cycle in the alkaline storage battery. The discharge capacity in the third cycle in the alkaline storage battery in the example 1 was set to 100, to find the discharge capacity in the third cycle in the other alkaline storage battery. The results thereof were together shown in the following Table 3.

TABLE 3

| | amount of Co (wt %) | amount of Al (wt %) | valence of Co | valence of Ni | discharge capacity in third cycle |
|---|---|---|---|---|---|
| example 1 | 5 | 20 | 3.53 | 2.0 | 100 |
| example 2 | 5 | 1 | 3.02 | 2.0 | 85 |
| example 3 | 5 | 5 | 3.15 | 2.0 | 92 |
| example 4 | 5 | 50 | 3.53 | 2.0 | 98 |
| example 5 | 5 | 60 | 3.54 | 2.0 | 84 |
| comparative example 1 | 5 | 20 | 3.00 | 2.0 | 81 |
| comparative example 1 | 5 | — | 3.00 | 2.0 | 80 |

As apparent from the results, in each of the alkaline storage batteries in the examples 1 to 5 using the positive electrode active material in which the surface of the nickel hydroxide was coated with the mixed crystal material of aluminum and cobalt, the valence of cobalt Co in the mixed crystal material exceeded 3.0, and the valence of nickel Ni in the nickel hydroxide was 2.0, a higher discharge capacity was obtained, as compared with those in the alkaline storage battery in the comparative example 1 using the positive electrode active material in which the valence of cobalt Co in the mixed crystal material of aluminum and cobalt did not exceed 3.0 and the alkaline storage battery in the comparative example 2 using the positive electrode active material in which the surface of the nickel hydroxide was coated with only the cobalt hydroxide.

Consider a case where the alkaline storage batteries in the examples 1 to 5 were compared with one another. In this case, in the alkaline storage batteries in the examples 1, 3, and 4 using the positive electrode active material in which the amount of aluminum Al contained in the mixed crystal material of aluminum and cobalt was in the range of 5 to 50 wt % of the total amount of aluminum and cobalt, a particularly high discharge capacity was obtained.

EXAMPLES 6 to 9

In the examples 6 to 9, in obtaining a positive electrode active material, in preparing a solution having cobalt sulfate and aluminum sulfate dissolved therein in the above-mentioned example 1, the amounts of cobalt sulfate and aluminum sulfate were changed, to prepare solutions by setting the weight of cobalt sulfate to 0.3 g and the weight of aluminum sulfate to 0.2 g in the example 6, setting the weight of cobalt sulfate to 2.5 g and the weight of aluminum sulfate to 1.6 g in the example 7, setting the weight of cobalt sulfate to 27.7 g and the weight of aluminum sulfate to 17.5 g in the example 8, and setting the weight of cobalt sulfate to 43.9 g and the weight of aluminum sulfate to 27.8 g in the example 9 such that the amount of cobalt was 0.1 wt % of the amount of nickel hydroxide in the example 6, 1 wt % thereof in the example 7, 10 wt % thereof in the example 8, and 15 wt % thereof in the example 9. The weight ratio of cobalt to aluminum in each of the solutions thus prepared was 80:20, as in the case of the example 1.

Particles of nickel hydroxide having a coating layer composed of a mixed crystal material of cobalt and aluminum formed on its surface were obtained in the same manner as that in the above-mentioned example 1 using each of the solutions of cobalt sulfate and aluminum sulfate thus prepared.

In mixing a 50 wt % sodium hydroxide aqueous solution with the particles of the nickel hydroxide having the coating layer composed of the mixed crystal material of cobalt and aluminum thus formed thereon as well as adding a 12 wt % sodium hypochlorite aqueous solution which is an oxidizing agent to an obtained mixture and reacting them, the amount of the 12 wt % sodium hypochlorite aqueous solution was set to 0.5 g in the example 6, 5.3 g in the example 7, 58.5 g in the example 8, and 92.9 g in the example 9, to obtain the positive electrode active materials in which the valence of cobalt Co in the coating layer was 3.53, and the valence of nickel Ni in the nickel hydroxide was 2.0.

In each of the positive electrode active materials, the amount of cobalt Co in the coating layer was 0.1 wt % of the amount of the nickel hydroxide in the example 6, 1 wt % thereof in the example 7, 10 wt % thereof in the example 8, and 15 wt % thereof in the example 9, as shown in the following Table 4, and the amount of aluminum Al was 20 wt % of the total amount of cobalt and aluminum in the coating layer was 20 wt % in each of the examples.

Alkaline storage batteries in the examples 6 to 9 were fabricated in the same manner as that in the above-mentioned case 1 except that each of the positive electrode active materials produced in the above-mentioned manner was used.

With respect to each of the alkaline storage batteries in the examples 6 to 9 fabricated in the above-mentioned manner, a discharge capacity in the third cycle was also found in the same manner as that in each of the alkaline storage batteries in the examples 1 to 5 and the comparative examples 1 and 2. The discharge capacity in the third cycle in the alkaline storage battery in the example 1 was set to 100, to find the discharge capacity in the third cycle in each of the alkaline storage batteries in the examples 6 to 9. The results thereof, together with the results in the example 1, were shown in the following Table 4:

TABLE 4

|  | amount of Co (wt %) | amount of Al (wt %) | valence of Co | valence of Ni | discharge capacity in third cycle |
|---|---|---|---|---|---|
| example 6 | 0.1 | 20 | 3.53 | 2.0 | 85 |
| example 7 | 1 | 20 | 3.53 | 2.0 | 97 |
| example 1 | 5 | 20 | 3.53 | 2.0 | 100 |
| example 8 | 10 | 20 | 3.53 | 2.0 | 97 |
| example 9 | 15 | 20 | 3.53 | 2.0 | 86 |

As apparent from the results, in each of the alkaline storage batteries in the examples 1, 7, and 8 using the positive electrode active materials in which the amount of cobalt Co in the coating layer composed of the mixed crystal material of aluminum and cobalt was in the range of 1 to 10 wt % of the amount of the nickel hydroxide, a higher discharge capacity than those in the alkaline storage battery in the example 6 in which the amount of cobalt was 0.1 wt % and the alkaline storage battery in the example 9 in which the amount of cobalt Co was 15 wt %.

EXAMPLES 10 AND 11 AND COMPARATIVE EXAMPLE 3

In the examples 10 and 11 and the comparative example 3, in obtaining a positive electrode active material, particles of nickel hydroxide having a coating layer composed of a mixed crystal material of cobalt and aluminum formed on its surface were obtained in the same manner as that in the above-mentioned example 1.

In mixing a 50 wt % sodium hydroxide aqueous solution with the particles of the nickel hydroxide having the coating layer composed of the mixed crystal material of cobalt and aluminum thus formed thereon as well as adding a 12 wt % sodium hypochlorite aqueous solution which is an oxidizing agent to an obtained mixture and reacting them, the amount of the 12 wt % sodium hypochlorite aqueous solution was set to 57.5 g in the example 10, 88.6 g in the example 11, and 119.7 g in the comparative example 3, to obtain positive electrode active materials in which the valence of cobalt Co in the coating layer was 3.53, while the valence of nickel Ni in the nickel hydroxide was 2.2 in the example 10, 2.3 in the example 11, and 2.4 in the comparative example 3, as shown in the following Table 5. In each of the positive electrode active materials, the amount of cobalt Co in the coating layer was 5 wt % of the amount of the nickel hydroxide, and the amount of aluminum Al was 20 wt % of the total amount of cobalt and aluminum in the coating layer, as in the above-mentioned example 1.

Alkaline storage batteries in the examples 10 and 11 and the comparative example 3 were fabricated in the same manner as that in the example 1 except that each of the positive electrode active materials produced in the above-mentioned manner was used.

With respect to each of the alkaline storage batteries in the examples 10 to 11 and the comparative example 3 fabricated in the above-mentioned manner, a discharge capacity in the third cycle was also found in the same manner as that in each of the alkaline storage batteries in the examples 1 to 5 and the comparative examples 1 and 2. The discharge capacity in the third cycle in the alkaline storage battery in the example 1 was set to 100, to find the discharge capacity in the third cycle in each of the alkaline storage batteries in the examples 10 to 11 and the comparative example 3. The results thereof, together with the results in the example 1, were shown in the following Table 5:

TABLE 5

|  | amount of Co (wt %) | amount of Al (wt %) | valence of Co | valence of Ni | discharge capacity in third cycle |
|---|---|---|---|---|---|
| example 1 | 5 | 20 | 3.53 | 2.0 | 100 |
| example 10 | 5 | 20 | 3.53 | 2.2 | 100 |
| example 11 | 5 | 20 | 3.53 | 2.3 | 100 |
| comparative example 3 | 5 | 20 | 3.53 | 2.4 | 81 |

As apparent from the results, in each of the alkaline storage batteries in the examples 1, 10, and 11 using the positive electrode active materials in which the surface of the nickel hydroxide was coated with the mixed crystal material of aluminum and cobalt, and the valence of cobalt in the mixed crystal material exceeded 3.0, while the valence of nickel in the nickel hydroxide was 2.0 to 2.3, a higher discharge capacity than that in the alkaline storage battery in the comparative example 3 using the positive electrode active material in which the valence of nickel was 2.4 was obtained.

Although in each of the above-mentioned examples, description was made of only a case where the positive electrode active material in which the surface of the nickel hydroxide was coated with the mixed crystal material of aluminum and cobalt, the same effect are obtained even in a case where a positive electrode active material coated with a mixed crystal material of an element selected from manganese Mn, iron Fe, yttrium Y, ytterbium Yb, erbium Er, and gadolinium Gd in place of aluminum and cobalt was used and a case where a positive electrode active material coated with a mixed crystal material of two or more types of elements selected from aluminum Al, manganese Mn, iron Fe, yttrium Y, ytterbium Yb, erbium Er, and gadolinium Gd and cobalt was used.

Although in each of the above-mentioned examples, the alkaline storage battery using the cadmium electrode as its negative electrode was illustrated, the same effect is obtained even in an alkaline storage battery using a zinc electrode or a hydrogen absorbing alloy electrode in place of the cadmium electrode as its negative electrode.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A positive electrode active material for alkaline storage batteries, wherein
   a surface of a nickel hydroxide is coated with a mixed crystal material of cobalt and at least one type of element selected from aluminum Al, manganese Mn, iron Fe, yttrium Y, ytterbium Yb, erbium Er, and gadolinium Gd,
   the valence of nickel in said nickel hydroxide being in the range of 2.0 to 2.3, and the valence of cobalt in said mixed crystal material exceeding 3.0.

2. The positive electrode active material for alkaline storage batteries according to claim 1, wherein
   the total amount of the elements, that is, aluminum Al, manganese Mn, iron Fe, yttrium Y, ytterbium Yb, erbium Er, and gadolinium Gd is in the range of 5 to 50% by weight of the total amount of the elements and cobalt.

3. The positive electrode active material for alkaline storage batteries according to claim 1, wherein
   the amount of cobalt in the mixed crystal material with which the surface of said nickel hydroxide is coated is in the range of 1 to 10% by weight of the amount of the nickel hydroxide.

4. The positive electrode active material for alkaline storage batteries according to claim 1, wherein
   said mixed crystal material is a mixed crystal material of aluminum Al and cobalt.

5. The positive electrode active material for alkaline storage batteries according to claim 2, wherein
   said mixed crystal material is a mixed crystal material of aluminum Al and cobalt.

6. The positive electrode active material for alkaline storage batteries according to claim 3, wherein
   said mixed crystal material is a mixed crystal material of aluminum Al and cobalt.

7. A positive electrode for alkaline storage batteries using the positive electrode active material for alkaline storage batteries according to claim 1.

8. A positive electrode for alkaline storage batteries using the positive electrode active material for alkaline storage batteries according to claim 2.

9. A positive electrode for alkaline storage batteries using the positive electrode active material for alkaline storage batteries according to claim 3.

10. A positive electrode for alkaline storage batteries using the positive electrode active material for alkaline storage batteries according to claim 4.

11. An alkaline storage battery using the positive electrode for alkaline storage batteries according to claim 7.

12. An alkaline storage battery using the positive electrode for alkaline storage batteries according to claim 8.

13. An alkaline storage battery using the positive electrode for alkaline storage batteries according to claim 9.

14. An alkaline storage battery using the positive electrode for alkaline storage batteries according to claim 10.

* * * * *